US008399572B2

(12) United States Patent
Laakso, Jr. et al.

(10) Patent No.: US 8,399,572 B2
(45) Date of Patent: Mar. 19, 2013

(54) VULCANIZABLE HALOGENATED ELASTOMER COMPOSITIONS

(75) Inventors: Raymond L. Laakso, Jr., St. Francisville, LA (US); Gary R. Marchand, Lake Jackson, TX (US); Sandra Watson, Brusly, LA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 11/719,222

(22) PCT Filed: Dec. 21, 2005

(86) PCT No.: PCT/US2005/046473
§ 371 (c)(1),
(2), (4) Date: May 14, 2007

(87) PCT Pub. No.: WO2006/069191
PCT Pub. Date: Jun. 29, 2006

(65) Prior Publication Data
US 2009/0076225 A1 Mar. 19, 2009

Related U.S. Application Data

(60) Provisional application No. 60/638,093, filed on Dec. 21, 2004.

(51) Int. Cl.
*C08C 19/20* (2006.01)
*C08C 19/22* (2006.01)
*C08F 8/34* (2006.01)

(52) U.S. Cl. .......... 525/350; 525/326.1; 525/331.4; 525/331.5; 525/343; 525/351; 525/374; 525/375; 525/381; 525/382

(58) Field of Classification Search .......... 525/326.1, 525/331.4, 331.5, 343, 350, 351, 374, 375, 525/381, 382
See application file for complete search history.

(56) References Cited

U.S. PATENT DOCUMENTS

| 3,332,915 | A | * | 7/1967 | James ........................... 525/347 |
| 3,454,544 | A | | 7/1969 | Young et al. |
| 3,510,443 | A | | 5/1970 | Vandenberg et al. |
| 4,128,510 | A | | 12/1978 | Richwine |
| 4,234,705 | A | | 11/1980 | Matoba |
| 4,288,576 | A | * | 9/1981 | Richwine ...................... 525/349 |
| 4,316,969 | A | * | 2/1982 | Koyama et al. ............... 525/145 |
| 4,342,851 | A | | 8/1982 | Suzui et al. |
| 4,357,446 | A | | 11/1982 | Matoba |
| 4,482,681 | A | | 11/1984 | Berta et al. |
| 4,551,505 | A | | 11/1985 | Sauerbier et al. |
| 4,558,102 | A | * | 12/1985 | Miyata ........................... 525/348 |
| 4,591,617 | A | | 5/1986 | Berta |
| 4,591,621 | A | | 5/1986 | Ennis |
| 4,767,823 | A | | 8/1988 | Jones et al. |
| 5,272,236 | A | | 12/1993 | Lai et al. |
| 5,278,272 | A | | 1/1994 | Lai et al. |
| 5,665,830 | A | | 9/1997 | Class |
| 5,686,537 | A | * | 11/1997 | Class ........................... 525/349 |
| 6,500,884 | B1 | * | 12/2002 | Tsujimura et al. ............... 524/83 |
| 6,699,944 | B1 | * | 3/2004 | Fujita et al. ................. 525/330.5 |
| 6,720,383 | B2 | | 4/2004 | Barclay et al. |

FOREIGN PATENT DOCUMENTS

| EP | 0489921 | | 6/1992 |
| EP | 1 000 988 | * | 5/2000 |
| EP | 1000988 | | 5/2000 |
| GB | 1585928 | | 3/1981 |
| WO | 00/24824 | * | 5/2000 |

OTHER PUBLICATIONS

Definition of "zeolite", Hawley's Condensed Chemical Dictionary, 14th Ed, 2002.*
MSDS "Molecular Sieves 13X"—2011.*
Mod et al, Journal of Applied Polymer Science, Vo. 30, 1049-1063 (1985) entitled "Curing Reaction of Elastomers with Triazine Thiols and Sulfen Amides".
Salerno, M., Elastomerics, 1992 entitled "New Thiadiazole Cure System Offers Benefits to Chlorinated Polymers".

* cited by examiner

*Primary Examiner* — Robert C Boyle

(57) ABSTRACT

The invention provides compositions comprising nitrogen containing chelating agents, which can be used to reduce the effects of zinc contamination on the vulcanization rates of polymercapto based cure systems for halogenated elastomers. Such chelating agents are effective at eliminating vulcanization rate inconsistencies due to zinc contamination, without inducing negative changes to the vulcanization reaction or the subsequent physical properties of the halogenated elastomer vulcanizate. The invention also provides methods of curing a halogenated elastomer using the inventive compositions, and for articles prepared from the same.

6 Claims, No Drawings

VULCANIZABLE HALOGENATED ELASTOMER COMPOSITIONS

This application claims the benefit of U.S. Provisional Application No. 60/638,093, filed on Dec. 21, 2004, incorporated herein, in its entirety, by reference.

The present invention relates to an improved cure system for halogenated elastomer compositions, comprising polymercapto crosslinking agents, vulcanization accelerators, an inorganic base, and a nitrogen containing chelating agent.

Halogenated elastomers may be cured by numerous means, including the use of peroxide/coagent systems, thiadiazole-based systems, or irradiation crosslinking techniques. Peroxide cures are typically preferred for their scorch safety, shelf-life or bin stability, low permanent set, and high temperature performance. However peroxide cure systems are often unacceptable for use in molded goods, because of mold sticking and fouling due to volatiles, or in applications that require a low temperature cure, due to equipment or processing limitations. Thiadiazole-based cure systems provide certain advantages, such as the ability to cure over a wider range of temperature and pressure conditions than peroxide cures, while generating fewer volatile by-products; good mold release characteristics, and the ability to use less expensive compounding ingredients, such as aromatic oils.

In U.S. Pat. No. 4,128,510, Richwine taught that halogen containing polymers could be crosslinked by using 2,5-dimercapto-1,3,4-thiadiazole, or its derivatives, and a basic material. The basic materials included metal oxides, metal hydroxides, and metal carboxylates. The '510 patent also taught that the addition of an accelerator containing aliphatic or aromatic amine structures or quaternary nitrogen groups may be desirable. The condensation product of butyraldehyde and aniline was claimed as being a particularly useful accelerator. In a second patent, U.S. Pat. No. 4,288,576, Richwine expanded the use of 2,5-dimercapto-1,3,4-thiadiazole and derivatives for curing saturated halogen containing elastomers, such as chlorinated polyethylene, by specifically including certain vulcanization accelerators. Named classes of accelerators in the '576 patent were: 1) amines having a boiling point above 110° C., and having pK values below about 4.5; 2) salts of amines, with pK values below 4.5 and acids having pK values above 2.0; 3) quaternary ammonium hydroxides and their salts with acids, having a pK above 2.0; 4) diphenyl- and ditolyl-guanidines; and 5) the condensation product of aniline and mono-aldehydes containing one to seven carbon atoms. The '576 patent additionally required the presence of at least an equal amount of an inorganic base.

Subsequent to the Richwine patents, several patents were issued claiming improved 2,5-dimercapto-1,3,4-thiadiazole systems. Berta and Kyllingstad, in U.S. Pat. No. 4,482,681, claimed that addition of a salt, with a contained water of hydration, could enhance the cure of 2,5-dimercapto-1,3,4-thiadiazole systems, if such a salt released water at temperatures above the compounding temperature, but below typical cure temperatures. Magnesium sulfate heptahydrate, sodium sulfite heptahydrate, and potassium aluminum sulfate dodecahydrate were specifically claimed examples of such salts. Sauerbier et al., in U.S. Pat. No. 4,551,505 claimed that amidoamines, such as tetraethylene pentamine distearate, were more useful as accelerators, than either amines or aniline-butyaldehyde condensation products, because of improved vulcanizate properties and better mold release.

Honsberg, in U.S. Pat. No. 4,745,147, claimed that the addition of polyhydroxy alcohols to the cure system of metal oxide, amine, and 2,5-dimercapto-1,3,4-thiadiazole; gave vulcanizates with improved heat aging characteristics, by lowering the amount of basic metal oxide required. Salerno introduced a specific 2,5-dimercapto-1,3,4-thiadiazole derivative and aliphatic amine combination that he claimed was superior to the 2,5-dimercapto-1,3,4-thiadiazole, monobenzoate-butyraldehyde-aniline condensation product system, because of improved bin stability of the mixed compound, and resistance to the batch-to-batch cure variations inherent in that system (Salerno, M. "New Thiadiazole Cure System Offers Benefits to Chlorinated Polymers", Elastomerics, April 1992). Class, in U.S. Pat. No. 5,665,830, claimed that variability in the premature curing, or scorch, of the 2,5-dimercapto-1,3,4-thiadiazole, amine, metal oxide system was due to the influence of water, and that the variation could be eliminated by addition of polyethylene glycol. In a subsequent patent, U.S. Pat. No. 5,686,537, Class claimed the use of glycerin to similarly eliminate the influence of water on these cure systems.

Vulcanizable compositions of halogenated elastomers using polymercapto compounds, other than 2,5-dimercapto-1,3,4-thiadiazole, have been disclosed and studied. Mori and Nakamura published studies on the use of 1,3,5-triazine-2,4,6-trithiol (Journal of Applied Polymer Science, Vol. 30, p. 1049, 1985). They found that the use of onium compounds, such as quaternary ammonium or phosphonium salts, or polyethylene glycols, were needed to increase vulcanization rates, when 1,3,5-triazine-2,4,6-trithiol is used to crosslink chlorinated polyethylenes. They suggested that the acceleration due to the use of polyethylene glycols was due to a mechanism similar to that of crown ether accelerators on nucleophilic substitution.

Additional polymercapto based vulcanization systems for halogenated elastomers, particularly co-curing rubber blends of halobutyl and epihalohydrin rubbers, were taught by Berta in U.S. Pat. No. 4,591,617. The '617 patent taught that treating trithiocyanuric acid, dithiohydantoins, dimercaptotriazoles, dithioltriazene, and various derivatives of these compounds with inorganic base and accelerator would be useful for curing chloroelastomers. Similar vulcanization systems for halogenated elastomers based on dimercaptopyrazine or dimercaptoquinoxaline were proposed by Matoba in U.S. Pat. No. 4,357,446.

Despite the excellent vulcanizate properties obtainable with the polymercapto/metal (hydr)oxide/-accelerator-based vulcanization systems for halogenated elastomers, two key problems remain that limit their usefulness. The first is premature vulcanization of the compound during storage, prior to forming the vulcanized article, and the second is inconsistency of the vulcanization rate. It is desired that the elastomer compound, after preparation, be stable under typical environmental conditions of storage, such that minimal vulcanization occurs prior to formation of the finished article. A consistent vulcanization rate is desired so that processes that form the finished vulcanized article, such as injection molding, extrusion, or compression molding, can be run consistently and without the generation of scrap materials.

The vulcanization rates of halogenated elastomer compositions that contain polymercapto compounds, such as 2,5-dimercapto-1,3,4-thiadiazole and its derivatives, metal (hydr)oxides and their salts with weak acids, and vulcanization accelerators, such as quaternary ammonium compounds or amines, are extremely sensitive to the presence of certain common impurities, such as acidic fillers, chlorinated paraffins, isocyanates, epoxy, lead, and particularly zinc compounds, such as zinc oxide, at levels as low as 50 ppm. Although efforts can be made to eliminate these ingredients from the desired composition, these impurities can remain in a piece of equipment from previous use, and inadvertently contaminate the composition.

Zinc oxide is a common ingredient in the sulfur-based vulcanization of a number of elastomers, and cross contamination of compounds is common in the rubber industry. We have found that it is possible to eliminate or significantly reduce the effect of zinc oxide contamination on the vulcanization rates of polymercapto based vulcanization systems for halogenated elastomers, by incorporation of nitrogen containing chelating compounds, such as 1,10-phenanthroline. While it is known that such chelating agents bind transition metal compounds, it is surprising that they are effective at eliminating vulcanization rate inconsistencies due to ZnO contamination, without inducing negative changes to the vulcanization reaction and the subsequent physical properties of the halogenated elastomer vulcanizate.

The invention provides for compositions comprising: a) a polymercapto crosslinking agent, b) a vulcanization accelerator, c) an inorganic base, and d) a nitrogen containing chelating agent that is soluble in a halogenated elastomer. These compositions and further embodiments of these compositions are described herein. These compositions are used to cure halogenated elastomers as discussed herein. The invention also provides for methods of curing a halogenated elastomer using the inventive compositions.

The invention provides for cured compositions formed an inventive composition as described herein. The invention also provides for an article comprising at least one component formed from an inventive composition as described herein. The invention further provides for an article comprising at least one component formed from a cured composition, which is formed form an inventive composition as described herein.

In one embodiment, the composition contains a nitrogen containing chelating agent is an aromatic heterocyclic base containing a nitrogen bidentate ligand. In another embodiment, the nitrogen containing chelating agent is 1,10-phenanthroline. In yet another embodiment, the nitrogen containing chelating agent is 2,2-bipyridyl.

In another embodiment, the composition contains a nitrogen containing chelating agent, which is a tridentate nitrogen containing compound, selected from the group consisting of terpyridine, diethylenetriamine, and derivatives thereof. In yet another embodiment, the nitrogen containing chelating agent is a tetradentate nitrogen containing compound, selected from the group consisting of triethylenetetramine, porphyrin, phthalocyanine, and derivatives thereof. In yet a further embodiment, nitrogen containing chelating agent is a polyamine, selected from the group consisting of an aziridine homopolymer, aziridine/1,2-diaminoethane copolymers, and the polymeric condensation product of ammonia and 1,2-dichloroethane.

In another embodiment, the composition contains a polymercapto curing agent, which is 2,5-dimercapto-1,3,4-thiadiazole or a derivative thereof. In yet another embodiment, the polymercapto curing agent is 2-mercapto-1,3,4-thiadiazole-5-thiobenzoate.

In another embodiment, the composition contains a vulcanization accelerator, which is selected from the group consisting of quaternary ammonium or phosphonium salts, tertiary amines, and dihydropyridine derivatives.

In another embodiment, the composition further contains a halogenated elastomer. In a further embodiment, the halogenated elastomer is selected from the group consisting of polychloroprene, polyepichlorohydrin, epichlorohydrin/ethylene oxide copolymers, a chlorosulfonated polyethylene, a chlorinated polyethylene, chlorinated ethylene alpha-olefin copolymers, copolymers of vinylidene fluoride and hexafluoropropylene, and chlorinated or brominated butyl rubbers. In yet another embodiment, the halogenated elastomer is a chlorinated polyethylene.

The inventive compositions may contain combinations of two or more embodiments as described herein. Methods of making the inventive compositions, and articles prepared from such compositions, may also contain combinations of two or more embodiments as described herein.

Any polymer or copolymer containing halogen atoms that can be compounded to form an elastomeric product upon crosslinking can be considered a halogenated elastomer for the purposes of this invention. Examples of halogenated elastomers include, but are not limited to polychloroprene, polyepichlorohydrin, epichlorohydrin/ethylene oxide copolymers, chlorosulfonated polyethylene, chlorinated polyethylene, chlorinated ethylene alpha-olefin copolymers, copolymers of vinylidene fluoride and hexafluoropropylene, and chlorinated or brominated butyl rubbers.

Examples of chlorinated ethylene copolymers include those prepared from copolymers comprising ethylene and at least one ethylenically unsaturated monomer, selected from the group consisting of $C_3$-$C_{10}$ alpha monoolefins. Chlorinated graft copolymers are included as well. Specific examples of suitable chlorinated ethylene copolymers, which may be employed in the compositions of this invention, include copolymers of ethylene with propylene, 1-butene, 3-methyl-1-pentene, 1-pentene, 1-hexene, 1-heptene or octene. The copolymers may be dipolymers, terpolymers, or higher order copolymers. Chlorinated polyethylene is a preferred chlorinated olefin elastomer. Some particular examples of chlorinated elastomers are described further below. Chlorinated ethylene ester copolymers, such as ethylene methyl acrylate and ethylene methyl methacrylate, may also be suitable for used in the invention, if the ester groups of such copolymers remain inert under the conditions of cure.

Polymercapto crosslinking agents include 2,5-dimercapto-1,3,4-thiadiazole, and its derivatives, as described in U.S. Pat. No. 4,128,510; 1,3,5-triazine-2,4,6-trithiol and its derivatives; dimercaptotriazoles, as described in U.S. Pat. No. 4,234,705; 2-4-dithiohydantoins, as described in U.S. Pat. No. 4,342,851; and 2,3-dimercapto-pyrazine or -quinoxalines, as described in U.S. Pat. No. 4,357,446. Preferably, the crosslinking agent is 2-mercapto-1,3,4-thiadiazole-5-thiobenzoate. The polymercapto compound is typically incorporated at levels from 0.5 to 5 parts per hundred parts (phr) of the halogenated elastomer. All individual values and subranges from 0.5 to 5 phr are included herein and disclosed herein. Each of these patents is incorporated herein, in its entirety, by reference.

Vulcanization accelerators useful in the composition include quaternary ammonium or phosphonium salts, tertiary amines, and dihydropyridine derivatives. Typical vulcanization accelerators include tetrabutylammonium bromide, tetrahexylammonium bromide, tetrabutylphosphonium chloride, or N-phenyl-3,5-diethyl-2-propyl-1,4-dihydropyridine. Vulcanization accelerators are incorporated at levels of 0.2-1 phr of the halogenated elastomer. All individual values and subranges from 0.2 to 1 phr are included herein and disclosed herein.

Inorganic bases such as a metal oxide, hydroxide, or their salts with weak acids act as an acid acceptor to capture the hydrohalogen acid that is formed as a byproduct of the curing reaction. Typical metals include those of Group II of the periodic table, such as Mg, Ca, or Ba. Examples of these compounds include, but are not limited to, magnesium oxide, magnesium hydroxide, calcium oxide, calcium hydroxide, barium hydroxide, magnesium carbonate, calcium carbonate and barium carbonate. Preferred basic metal oxides and hydroxides are magnesium oxide and magnesium hydroxide. The basic metal oxides are incorporated at levels of 2-10 phr of the halogenated elastomer. All individual values and subranges from 2 to 10 phr are included herein and disclosed herein.

Nitrogen containing chelating compounds include bidentate nitrogen compounds, tridentate nitrogen compounds, tetradendate nitrogen compounds and polydentate nitrogen compounds. Each chelating compound contains two or more nitrogen atoms that are oriented in a configuration capable of forming a coordination complex in association with a charged or polarizable metal atom or other charged or polarizable moiety. Such compounds do not contain only two nitrogen atoms at para positions, relative to one another, on one or more aromatic rings.

Bidentate nitrogen compounds include, but are not limited to, ethylenediamine, 2,2'-bipyridine, 1,10-phenanthroline, and derivatives thereof. Such derivatives, as the term is used herein, are compounds based on the structure of the respective parent compound.

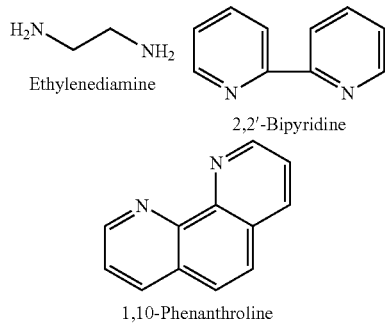

Ethylenediamine

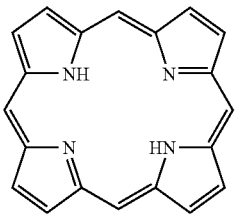

2,2'-Bipyridine 1,10-Phenanthroline

Tridentate nitrogen containing compounds, include, but are not limited to, a terpyridine, diethylenetriamine, and derivatives thereof. Representative structures are shown below.

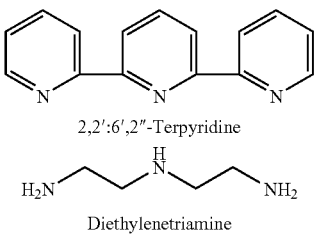

2,2':6',2''-Terpyridine

Diethylenetriamine

Tetradentate nitrogen containing compounds, include, but are not limited to, triethylenetetramine, porphyrin, phthalocyanine, and derivatives thereof.

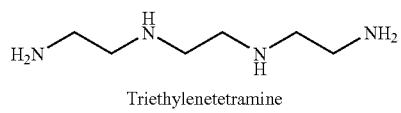

Triethylenetetramine

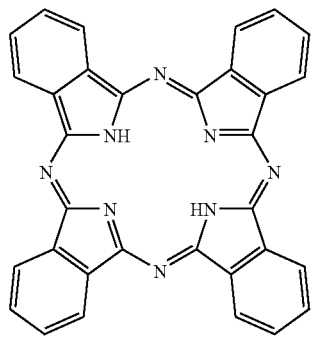

Porphyrin

Phthalocyanine

Polydentate nitrogen containing compounds, include, but are not limited to, aziridine homopolymers (or polyethyleneimines), aziridine/1,2-diaminoethane copolymers, polymeric condensation product of ammonia and 1,2-dichloroethane, or derivatives thereof. Representative polyethyleneimines (PEIs) are polymeric amines with the general backbone unit, $—(CH_2—CH_2—NH)_n—$, where "n" is from 10 to $10^5$. Polyethyleneimines may also include branched and/or spherical polyamines. In general, these structures usually have a well defined ratio of primary, secondary and tertiary amine functions, and are commercially available from BASF and Bayer. An example of a portion of a representative polyethyleneimine is shown below.

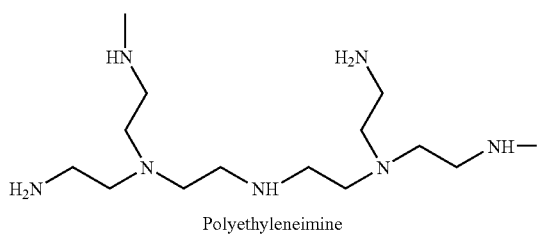 [SMILES: CNCCN(CCN)CCNCCN(CCN)CCNC]

Polyethyleneimine

In one embodiment, nitrogen containing chelating compounds, suitable for used in the present invention, preferably do not contain any heteroatoms, other than nitrogen and oxygen, and more preferably contain only hydrogen, carbon and nitrogen.

In another embodiment, the nitrogen containing chelating compound contains an N—C—C—N bonding sequence in the structure of the compound. In a further embodiment, the N—C—C—N bonding sequence is selected from the structures shown below:

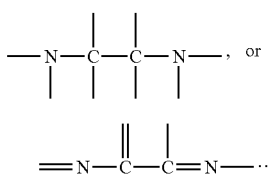

The nitrogen containing chelating compound must be soluble or finely dispersible in the polymer phase of the compound in order to be an effective component of the invention. Furthermore, it is preferable that the nitrogen containing chelating agent have a boiling point that exceeds the temperature at which the elastomer compound is cured, so that occupational exposure to the chelating agent and bubble formation in the finished elastomer product are minimized.

Some nitrogen containing chelating compounds, such as ethylenediamine-tetraacetic acid (EDTA) and it salts, are not soluble or dispersible in many elastomer compounds, and therefore are not effective. The magnitude of the effect at eliminating the cure rate inconsistency varies with the structure of the nitrogen containing chelating compound. Preferable nitrogen containing chelating agents are 1,10-phenanthroline and its derivatives. Nitrogen containing chelating agents are incorporated at levels from 0.2-2 phr of the halogenated elastomer. Preferably, the level of the nitrogen containing chelating agent is from 0.5-1.5 phr of the halogenated elastomer. All individual values and subranges from 0.2-2 phr are included herein and disclosed herein.

Compositions of the present invention may include other ingredients commonly used in rubber vulcanization, such as fillers, extenders, plasticizers, stabilizers, and pigments. The properties of the final vulcanizate can be adjusted by addition of these materials to suit the application. Examples of common fillers are calcium carbonate, carbon black and clay. Extenders and plasticizers are usually aromatic or napthenic oils or esters. A typical pigment is titanium dioxide.

The ingredients of the elastomer composition are typically mixed and uniformly blended with the halogenated elastomeric polymer by use of a high intensity, internal mixer, such as a Banbury® mixer (Farrel Corporation). They may also be incorporated by milling on a two roll mill, or by any other mechanical mixing device from which a uniform blend of the ingredients can be derived. It is preferable to mix the ingredients of the elastomeric composition such that the temperature of the composition does not exceed about 110° C., and the time of the mixing is maintained, as short as is necessary, to achieve a uniform composition.

The mixing process may be improved by adding some of the ingredients in a binder. For example, reaction accelerators can be bound in a polymer such as ethylene-propylene-diene rubber at concentrations of 25-75 percent of the accelerator, thus making addition of small amounts of ingredient easier to handle. Whether the ingredients are added neat, or as binders, does not materially affect the results of this invention.

The conditions under which the elastomeric compound is crosslinked into the elastomeric product, range from temperatures from 130° C. to 200° C., and from atmospheric to high pressures, such as those encountered in compression or injection molding. The time for the crosslinking reaction to take place varies with the temperature and the concentrations of polymercapto compound, accelerator, and metal oxide in the composition. Lower temperatures and lower concentrations require longer times for the finished part to be crosslinked. Typical crosslinking times may be from one minute to several hours.

Suitable chlorinated polyethylene elastomers may be selected from the group consisting of a) chlorinated polyethylene homopolymers prepared from polyethylenes having an I10 value of from 0.01-120 dg/min, and more preferably from 0.05 to 100 dg/min, and b) chlorinated ethylene copolymers prepared from ethylene copolymers having an I10 value of from 0.01-120 dg/min that comprise copolymerized units of i) ethylene and ii) up to 25 weight percent (based on the total weight of monomers) of a copolymerizable monomer.

Some particular examples of halogenated elastomers include chlorinated elastomers, as described in U.S. Pat. No. 6,720,383, incorporated herein, in its entirety, by reference. Such elastomers include a chlorinated olefin elastomer having a chlorine content of from 15-48 percent by weight; said chlorinated olefin elastomer is prepared from an olefin polymer selected from the group consisting of: i) polyethylene homopolymers having I10 values of from 0.05-0.8 dg/minute, and ii) copolymers of ethylene and up to 25 weight percent of a copolymerizable monomer, said copolymers having I10 values of from 0.05-0.8 dg/minute.

In one embodiment, the chlorinated olefin elastomers useful in the practice of the invention contain 15-48 weight percent chlorine, preferably 25 to 38 weight percent chlorine, based on the total weight of the elastomer. In another embodiment, the molecular weights of the non-chlorinated polyolefin base resins range from approximately 400,000-1,000,000 g/mole.

In another embodiment, the chlorinated olefin elastomers suitable for use in the compositions of the invention may be prepared from polyolefin resins that are branched or unbranched. The polyolefin base resins may be prepared by free radical processes, Ziegler-Natta catalysis, or catalysis with metallocene catalyst systems, for example those disclosed in U.S. Pat. Nos. 5,272,236 and 5,278,272, each incorporated herein, in its entirety, by reference.

Chlorine can be introduced to the polyethylene in a variety of ways: solution chlorination, aqueous slurry chlorination (Dow process for TYRIN), fluidized bed chlorination, melt chlorination, and other chlorination processes. The total level of chlorine introduced to the polymer can vary depending upon the product needs and the process capabilities. Typical commercial grades range from 25-42 wt percent chlorine, although it is possible to go beyond this range. Chlorination of the base resins may take place in suspension, solution, solid state or fluidized bed. Free radical suspension chlorination processes are described in U.S. Pat. Nos. 3,454,544, 4,767, 823, each incorporated herein by reference, and references cited therein. Such processes involve preparation of an aqueous suspension of a finely divided ethylene polymer, which is then chlorinated. An example of a free radical solution chlorination process is disclosed in U.S. Pat. No. 4,591,621, incorporated herein by reference. The polymers may also be chlorinated in the melt or fluidized beds, for example, as taught in U.S. Pat. No. 4,767,823, incorporated herein by reference.

A variety of ethylene-containing feedstocks with varying densities can be used in the chlorination process. The limiting factor in most cases is the process by which the chlorination takes place (solution, slurry, etc.).

The placement of chlorine on the backbone can be varied, via the chlorination process, to produce resins that have a random distribution of chlorine, or a block distribution of chlorine. An example of a random distribution of chlorine includes roughly one chlorine per every five carbon atoms in a 36 weight percent chlorine containing polymer. An example of a block distribution of chlorine includes polymers sequences along the polyethylene backbone that are heavily chlorinated (one chlorine per every two carbon atoms), and adjacent sequences along the same backbone that are primarily composed of ethylene. Polymers containing both random and block distributions of chlorine are also included with the scope of the invention. In a preferred embodiment, the polymer contains a random distribution of chlorine along the backbone of the molecular chains of the polymer sample.

repeated an additional 5-6 times to ensure adequate dispersion of all the ingredients. The final sheet was obtained from the mill in a thickness of approximately 3 mm. Samples cut from this final sheet were used to measure cure rates and to compression mold plaque samples for testing the physical properties of the vulcanizate.

TABLE 1

Compositions of Comparative Examples A and B and Examples 1 and 2 of the Invention

| Ingredient | Supplier | Comparative Ex. A, phr | Comparative Ex. B, phr | Ex. 1, phr | Ex. 2, phr |
|---|---|---|---|---|---|
| Chlorinated Polyethylene Tyrin ® CM 0836 | Dow | 100 | 100 | 100 | 100 |
| Carbon Black, N-774 | Sid Richardson Carbon Co. | 50 | 50 | 50 | 50 |
| Magnesium Hydroxide, StanMag ® Hydroxide B | Harwick | 5 | 5 | 5 | 5 |
| Aromatic Oil, Sundex ® 790T | Sunoco, Inc | 30 | 30 | 30 | 30 |
| 2-mercapto-1,3,4-thiadiazole-5-thiobenzoate, Mastermix ® MB 4842, 75 percent Active | Harwick | 2.67 | 2.67 | 2.67 | 2.67 |
| Tetrabutylammonium bromide, Mastermix ® MB 4988, 50 percent active | Harwick | 0.66 | 0.66 | 0.66 | 0.66 |
| Zinc Oxide, ZnO-85, 85 percent active | Rhein Chemie | | 0.14 | | 0.14 |
| 1,10-phenanthroline | Aldrich | | | 1 | 1 |

EXAMPLES

The following examples illustrate the present invention but are not intended to limit the scope of the invention. The examples of the invention demonstrate that the addition of a soluble nitrogen containing chelating agent reduces the inconsistency of the cure rate, associated with contamination of the composition with zinc oxide, when crosslinking halogenated elastomers with polymercapto compound, basic metal oxide, and accelerator cure systems. They also demonstrate that the improvement in consistency of the cure rate is accomplished without inducing negative changes in the vulcanization reaction or the resultant physical properties of the vulcanizate.

The compositions of the examples are listed in Tables 1 and 4, which also list the source for all materials. All ingredient amounts are based on 100 parts by weight of the halogenated elastomer. Comparative Examples A and B show the effect of ZnO contamination without the addition of the nitrogen containing chelating agent. Examples 1 and 2 show the effect of ZnO contamination in the presence of 1,10-phenanthroline as the chelating agent. Examples 3 and 4 show the effect of ZnO contamination in the presence of a polyamine as the chelating agent.

Each of the compositions in Tables 1 and 4 was mixed using a Banbury® BR internal mixer (Farrel Corporation). The dry ingredients were charged to the mixer first, followed by the liquid ingredients, and then the halogenated elastomer. A slow mixing speed was used. The Banbury chute was swept down after the compound had fluxed and was dumped from the mixer at 105° C. The compound discharged from the mixer was placed on a 6 inch×13 inch two roll mill and was rolled as it came off the mill. This mill procedure was Cure rate testing was accomplished according to ASTM D2084 on a Monsanto Oscillating Disk Rheometer (ODR), at 177° C. Samples for physical property testing were compression molded at 177° C. on a PHI Rubber Press. Cure times were determined from the ODR cure rate test using the $t_{90}$ cure time plus an additional 10 percent. The $t_{90}$ time is the time, in minutes, for the sample to reach 90 percent of the final torque observed during the test. Physical property testing on the compression molded vulcanizates was conducted according to ASTM D412.

Table 2 lists the cure rate data obtained for Comparative Examples A and B and Examples 1 and 2 of the invention. The ODR test was run for 25 minutes for all the examples. The data for Comparative Examples A and B shows that the cure rate has been markedly depressed by the addition of ZnO. This is shown most clearly by the large increase in $t_{50}$, which is the time for the torque to reach 50 percent of change between the minimum (ML min) and the maximum (MH max), and the corresponding $t_{90}$, which is the time for the sample to reach 90 percent of the torque difference. The MH max in Comparative Example B is also much less than in Comparative Example A, indicating that by the end of the test, the sample was not finished crosslinking. In contrast, Examples 1 and 2 of the present invention have markedly reduced differences in the cure rate parameters as shown in Table 2.

TABLE 2

Cure Parameters of Comparative Examples A and B and Examples 1 and 2 of the Invention

| | Comparative Example A | Comparative Example B | Example 1 | Example 2 |
|---|---|---|---|---|
| ML min (in-lb) [cm-kg] | 15.52 [17.88] | 13.54 [15.60] | 16.55 [19.06] | 16.46 [18.96] |

TABLE 2-continued

Cure Parameters of Comparative Examples A and
B and Examples 1 and 2 of the Invention

| | Comparative Example A | Comparative Example B | Example 1 | Example 2 |
|---|---|---|---|---|
| MH max (in-lb) | 54.02 | 36 | 58.34 | 56.7 |
| [cm-kg] | [62.23] | [41] | [67.20] | [65.31] |
| ts1 (minutes) | 1.03 | 2.57 | 0.99 | 0.92 |
| ts2 (minutes) | 1.18 | 3.38 | 1.12 | 1.06 |
| t2 (minutes) | 0.98 | 2.06 | 0.95 | 0.88 |
| $t_{50}$ (minutes) | 2.93 | 10.79 | 2.37 | 2.8 |
| $t_{90}$ (minutes) | 8.96 | 21.4 | 5.71 | 7.37 |
| MAX – MIN (in-lb) | 38.5 | 22.46 | 41.79 | 40.24 |
| [cm-kg] | [44.35] | [25.87] | [48.14] | [46.35] |

The physical properties of the vulcanizates obtained by curing and compression molding are shown in Table 3. Elongation at break and ultimate tensiles of the Examples 1 and 2 are superior to Comparative Examples A and B in every case. In addition there is no negative effect on vulcanizate properties by addition of the nitrogen containing chelating agent according to the present invention.

TABLE 3

Physical Properties of the Vulcanizates of Comparative
Examples A and B and Examples 1 and 2 of the Invention

| | Comparative Example A | Comparative Example B | Example 1 | Example 2 |
|---|---|---|---|---|
| M50 (psi) | 150 | 151 | 134 | 122 |
| [kg/cm$^2$] | [10.5] | [10.6] | [9.42] | [8.58] |
| M100 (psi) | 632 | 592 | 549 | 516 |
| [kg/cm$^2$] | [44.4] | [41.6] | [38.6] | [36.3] |
| M200 (psi) | 1249 | 982 | 924 | 879 |
| [kg/cm$^2$] | [87.8] | [69.0] | [65.0] | [61.8] |
| Ultimate Tensile (UT)(psi) | 2548 | 2284 | 2698 | 2599 |
| [kg/cm$^2$] | [179.1] | [160.5] | [189.6] | [182.7] |
| Elongation @UT (percent) | 544 | 684 | 736 | 725 |
| Tensile @ Break (psi) | 2548 | 2281 | 2698 | 2599 |
| [kg/cm$^2$] | [179.1] | [160.3] | [189.6] | [182.7] |
| Elongation @ Break (percent) | 544 | 685 | 736 | 725 |
| Hardness, Shore A | 72 | 73 | 71 | 71 |

Table 4 shows the compositions of Comparative Examples A and B and Examples 3 and 4 of the invention where a polyamine is used as a nitrogen containing chelating agent. The cure rate parameters and physical properties of the vulcanizates are listed in Tables 5 and 6, respectively. The polyamine used, in addition to providing protection against ZnO contamination, also accelerates the cure rate parameters. Examples 3 and 4 show that in the presence of a significant amount of ZnO, the cure rate parameters do not change when the polyamine is present in the composition in accordance with the invention.

TABLE 4

Composition of Comparative Examples A and
B and Examples 3 and 4 of the Invention

| Ingredient | Supplier | Comp. Ex. A, phr | Comp. Ex. B, phr | Ex. 3, phr | Ex. 4, phr |
|---|---|---|---|---|---|
| Chlorinated Polyethylene Tyrin ® CM 0836 | Dow | 100 | 100 | 100 | 100 |
| Carbon Black, N-774 | Sid Richardson Carbon Co. | 50 | 50 | 50 | 50 |
| Magnesium Hydroxide, StanMag ® Hydroxide B | Harwick | 5 | 5 | 5 | 5 |
| Aromatic Oil, Sundex ® 790T | Sunoco, Inc | 30 | 30 | 30 | 30 |
| 2-mercapto-1,3,4-thiadiazole-5-thiobenzoate, Mastermix ® MB 4842, 75 percent Active | Harwick | 2.67 | 2.67 | 2.67 | 2.67 |
| Tetrabutylammonium bromide, Mastermix ® MB 4988, 50 percent active | Harwick | 0.66 | 0.66 | 0.40 | 0.40 |
| Zinc Oxide, ZnO-85, 85 percent active | Rhein Chemie | | | 0.14 | 0.14 |
| Polyethyleneimine, Mn ~ 600 | Aldrich | | | 2 | 2 |

TABLE 5

Cure Parameters for Comparative Examples A
and B and Examples 3 and 4 of the Invention

|  | Comparative Example A | Comparative Example B | Example 3 | Example 4 |
|---|---|---|---|---|
| ML min (in-lb) [cm-kg] | 15.52 [17.88] | 13.54 [15.60] | 22.2 [25.6] | 20.4 [23.5] |
| MH max (in-lb) [cm-kg] | 54.02 [62.23] | 36 [41] | 52.15 [60.07] | 49.2 [56.7] |
| ts1 (minutes) | 1.03 | 2.57 | 0.83 | 0.78 |
| ts2 (minutes) | 1.18 | 3.38 | 0.99 | 0.93 |
| t2 (minutes) | 0.98 | 2.06 | 0.76 | 0.7 |
| t50 (minutes) | 2.93 | 10.79 | 2.83 | 2.77 |
| t90 (minutes) | 8.96 | 21.4 | 7.17 | 7.29 |
| MAX − MIN (in-lb) [cm-kg] | 38.5 [44.3] | 22.46 [25.87] | 29.95 [34.50] | 28.8 [33.2] |

TABLE 6

Physical Properties of the Vulcanizates of Comparative
Examples A and B and Examples 3 and 4 of the Invention

|  | Comparative Example A | Comparative Example B | Example 3 | Example 4 |
|---|---|---|---|---|
| M100 (psi) [kg/cm$^2$] | 632 [44.4] | 592 [41.6] | 1004 [70.57] | 730 [51.3] |
| M200 (psi) [kg/cm$^2$] | 1249 [87.80] | 982 [69.0] | 1983 [139.4] | 1694 [119.1] |
| Ultimate Tensile (UT) (psi) [kg/cm$^2$] | 2548 [179.1] | 2284 [160.5] | 2546 [179.0] | 2748 [193.2] |
| Elongation @ Break (percent) | 544 | 685 | 287 | 357 |
| Hardness, Shore A | 72 | 73 | 70 | 71 |

What is claimed is:

1. A composition consisting:
    a) a polymercapto crosslinking agent,
    b) a vulcanization accelerator,
    c) an inorganic base,
    d) a nitrogen containing chelating agent, wherein the nitrogen containing chelating agent is selected from the group consisting of 1,10-phenanthroline, 2,2-bipyridyl, and polyethylenimine; and
    e) a halogenated elastomer; wherein said nitrogen containing chelating agent is soluble in said halogenated elastomer.

2. The composition of claim 1, wherein the polymercapto curing agent is 2,5-dimercapto-1,3,4-thiadiazole or a derivative thereof.

3. The composition of claim 1, wherein the polymercapto curing agent is 2-mercapto-1,3,4-thiadiazole-5-thiobenzoate.

4. The composition of claim 1, wherein the vulcanization accelerator is selected from the group consisting of quaternary ammonium or phosphonium salts, tertiary amines, and dihydropyridine derivatives.

5. The composition of claim 1, wherein the halogenated elastomer is selected from the group consisting of polychloroprene, polyepichlorohydrin, epichlorohydrin/ethylene oxide copolymers, a chlorosulfonated polyethylene, a chlorinated polyethylene, chlorinated ethylene alpha-olefin copolymers, copolymers of vinylidene fluoride and hexafluoropropylene, and chlorinated or brominated butyl rubbers.

6. The composition of claim 1, wherein the halogenated elastomer is a chlorinated polyethylene.

\* \* \* \* \*